(12) United States Patent
Pochiraju et al.

(10) Patent No.: US 9,322,646 B2
(45) Date of Patent: Apr. 26, 2016

(54) ADAPTIVE MECHANISM CONTROL AND SCANNER POSITIONING FOR IMPROVED THREE-DIMENSIONAL LASER SCANNING

(75) Inventors: Kishore V. Pochiraju, Princeton Junction, NJ (US); Hao Men, Harrison, NJ (US); Biruk Assefa Gebre, Weehawken, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 739 days.

(21) Appl. No.: 13/581,742

(22) PCT Filed: Apr. 8, 2011

(86) PCT No.: PCT/US2011/031730
§ 371 (c)(1),
(2), (4) Date: Oct. 10, 2012

(87) PCT Pub. No.: WO2011/127375
PCT Pub. Date: Oct. 13, 2011

(65) Prior Publication Data
US 2013/0054187 A1 Feb. 28, 2013

Related U.S. Application Data

(60) Provisional application No. 61/322,466, filed on Apr. 9, 2010.

(51) Int. Cl.
*G01B 11/14* (2006.01)
*G06F 15/00* (2006.01)
*G01C 3/08* (2006.01)
(Continued)

(52) U.S. Cl.
CPC .............. *G01C 3/08* (2013.01); *G01S 7/4808* (2013.01); *G01S 7/4811* (2013.01); *G01S 7/4817* (2013.01); *G01S 17/89* (2013.01)

(58) Field of Classification Search
CPC ..... G01S 17/89; G01S 7/4808; G01S 7/4811; G01S 7/4817
USPC ........................................................ 702/150
See application file for complete search history.

(56) References Cited

U.S. PATENT DOCUMENTS 6,600,553 B1 * 7/2003 Stone ........................... 356/4.01
2003/0094495 A1 5/2003 Knowles et al.
(Continued)

FOREIGN PATENT DOCUMENTS

WO WO 2011/127375 A1 10/2011

OTHER PUBLICATIONS

International Search Report and Written Opinion regarding International (PCT) Application No. PCT/US2011/031730, mailed Aug. 30, 2011.
(Continued)

*Primary Examiner* — John Breene
*Assistant Examiner* — Peter Ngo
(74) *Attorney, Agent, or Firm* — Greenberg Traurig, LLP

(57) ABSTRACT

A method of adaptively positioning a scanner [10] within a three-dimensional scene identifies an optimal next position for the scanner [40] based on analysis of a data point cloud that mimics the scanned portion of the scene. Occluded areas [38] are delineated from scan data and scans made at different locations in the scene are registered to a reference four-coordinate system. The fourth coordinate corresponds to the hue observed by the scanner at each data point.

1 Claim, 16 Drawing Sheets

(51) Int. Cl.
*G01S 7/481* (2006.01)
*G01S 17/89* (2006.01)
*G01S 7/48* (2006.01)

(56) References Cited

U.S. PATENT DOCUMENTS

2003/0102379 A1 6/2003 Tsikos et al.
2008/0257096 A1 10/2008 Zhu et al.
2009/0273771 A1* 11/2009 Gittinger et al. ............. 356/5.01
2010/0302528 A1* 12/2010 Hall .............................. 356/5.01
2014/0078519 A1 3/2014 Steffey et al.

OTHER PUBLICATIONS

International Preliminary Report on Patentability regarding International (PCT) Application No. PCT/US2011/031730, mailed Oct. 9, 2012.

* cited by examiner

Initial Scan Segment

Evaluation of Frontiers and Point Determination

Registration of Map Segments and NBV Determination from Global Map

Complete 3D Mapping of the Area

Initial Scan with Blind Area

Detect Occluded Areas

Generate Frontier and Candidate Positions 2,3 and 4

Calculate View Potential and Cost for Traveling to Candidate Positions, Pick the Optimal Transmit Path (i.e, From Position 1 to Position 3)

ADAPTIVE MECHANISM CONTROL AND SCANNER POSITIONING FOR IMPROVED THREE-DIMENSIONAL LASER SCANNING

CROSS-REFERENCE TO RELATED APPLICATIONS

The present application is a §371 conversion of International (PCT) Application No. PCT/US2011/031730, filed on Apr. 8, 2011, which is incorporated by reference herein in its entirety, and further claims the benefit of U.S. Provisional Patent Application No. 61/322,466, filed Apr. 9, 2010, which is incorporated by reference herein in its entirety.

FIELD OF THE INVENTION

The present invention relates to light detection and ranging (LIDAR) laser scanning, and, more particularly, to resolution control, precision control and positioning of the scanning device within a scene for effective three-dimensional (3D) LIDAR scanning. The invention includes scanning hardware and adaptive algorithms for controlling such hardware in the environment being scanned, and algorithms for generating 3D global maps from scanning data.

BACKGROUND OF THE INVENTION

Light detection and ranging (LIDAR) scanners are non-contact measurement devices that work by emitting a very narrow light pulse and analyzing the reflection of the light pulse from an object. In order to scan a three dimensional (3D) area from a single observation position, these scanners typically employ actuators to rotate the LIDAR assembly and/or use rotating mirrors to reflect the light pulse around the scene. The result is a 3D point cloud of precise distance measurements of the scene from the observation position of the LIDAR scanner. The device can also map color information from the scene by integrating imaging sensors with the LIDAR ranging sensors.

In order to expand the area covered by the LIDAR scan, the scanner is moved to another observation position (also referred to as the next vantage position) and a new scan is generated. Scans from various vantage positions can be merged to create a complete 3D map of the area. The vantage positions must be selected to fill in areas of occlusions (i.e., areas hidden by object shadows) and efficiently cover large areas with minimum scan points The 3D LIDAR scanners maintain constant speed on rotary actuators to distribute the points evenly about a polar coordinate system. Considering $(r,\theta,\phi)$ as the polar coordinate system relative to the scanning position, constant actuation speed and sampling of the scanners distributes the scan points evenly along the $\theta$ and $\phi$ coordinates. However, the range variation will depend upon the relative positioning of the objects in the scene and varies from scene to scene. This range variation produces a non-uniform point distribution of points in the Cartesian coordinates about the same scanner position reference. As a result, objects closer to the LIDAR scanner will have a higher point density compared to objects further from the scanner.

Also, the laser beam emanating from the scanner diverges from the source and creates a spot on the object being scanned. Objects further away from the scanner have larger spot diameters compared to the objects that are close by. When the larger spots hit corners of the objects the precision of the measurement is adversely affected. In order to control both the resolution and distribution of the points of the scan, and provide scan data that are uniformly distributed within a scene, adaptive control is needed for both the speed of the rotary mechanisms and divergence of the beam.

Different aspects of a representative conventional LIDAR scanner are illustrated in FIGS. 1-4. The LIDAR scanner 10 includes a laser diode (not shown) used for emitting an infra-red light pulse. The light pulse 12 is reflected from the object 14 as a reflected pulse 16 which is received by a detector (not shown) in the scanner 10. Rotary mirrors and actuators (not shown) are used for steering the light pulse 12 within an area of interest of the object 14. Electronics (not shown) are used for processing and calculating the precise 3D coordinates of the scanned object based on the calculated travel time of the emitted and reflected pulses 12, 16 and the angles of displacement of the actuators and rotary mirror.

As illustrated in FIGS. 2-4, the conventional 3D scanner 10 may rotate from side-to-side in opposite angular directions, represented by double-arrow 18, about a vertical axis 20 and/or up-and down in opposite angular directions, represented by double-arrow 22, about a horizontal axis 24. Referring to FIG. 3, rotation of the 3D scanner 10 about the vertical axis 20, without rotation about the horizontal axis 24, results in a 2D distribution of emitted pulses, represented by the straight dotted lines 26, in a horizontal plane. Although not depicted in the figures, rotation of the 3D scanner 10 about the horizontal axis 24, without rotation about the vertical axis 20, would result in a 2D distribution of emitted pulses in a vertical plane. Referring to FIG. 4, rotation of the 3D scanner about both the vertical axis 20 and the horizontal axis 24 results in a distribution of emitted pulses through a 3D space, represented by the straight dotted lines 26 and the curved dotted lines 28 extending out of the plane of the straight dotted lines 26.

With conventional 3D scanners, the rotary actuators are operated at a constant speed during a scan. These scanners produce non-uniform point distributions within a 3D scan scene as measurement points closer to the scanner will have higher point densities than points further from the scanner as illustrated in the FIG. 5. More specifically, it can be seen that for the same angular rotation theta ($\theta$), objects closer to the scanner (distance R1) will have a higher point density (i.e., a smaller point distribution spacing D1) compared to objects further from the scanner (distance R2) while having a lower point density (i.e., a larger point distribution spacing D2). FIG. 6 depicts a graph of measurement distances, in meters versus point distribution spacing, in meters for various $\theta$ values.

Conventional LIDAR scanners also have fixed laser beam divergence. FIG. 7 shows components used in the typical 3D LIDAR scanner 10. A lens 28 is placed in the light transmission path to diverge the beam 30. The divergence of beam 30 is necessary so that a finite spot size (e.g. beam spot diameter 32) is created and the beam 30 does not miss small features in the objects 34, 36 being scanned. However, for surfaces located far away from the scanner but within the scanner range, the beam divergence leads to large spot diameters 32 which cause a noisy return signal (not shown), also known as "edge noise", at the edges 38 of the object 34. The range data produced from the scanner will be erroneous in such situations.

FIG. 7 also shows the typical LIDAR returns and best estimates for the location of the surfaces of two walls (i.e., objects 34, 36), which walls are depicted in FIG. 8. The scene of FIG. 8 has been reconstructed from data reproduced during a LIDAR scan. While both walls 34, 36 were scanned with uniform scan patterns, the laser spot hit both the surfaces at the corner 38. This leads to erroneous reconstruction of the object geometry, resulting in the corner 38 being obscured. Varying the beam divergence to a smaller angle γ (referenced on FIG. 7) enhances the precision of the scan. Using a smaller beam diameter for the entire scene, however, is very inefficient. This inefficiency is due to the fact that more measurements are required for covering an area with a small spot diameter beam and edge noise only occurs when the spot is split by two surfaces at different distances from the scanner.

LIDAR scans taken from a single point also include areas that are occluded by objects in the scene. The scanner must be moved to a variety of positions to fill in data points representing the occluded areas. It is also necessary to move and position the LIDAR scanner to enlarge the coverage area or field of view of the scan. Under conventional methods, a human operator assesses the scene to be scanned and determines the next best scan position. Such positioning is prone to errors and may still result in a scene map having gaps in the scan data.

SUMMARY OF THE INVENTION

In a first aspect, the present invention provides a method for adaptive speed control of 3D LIDAR scanning actuators which provides improved point distribution uniformity and precision of range measurements for rotary 3D LIDAR scanners. The method takes into account the scene being scanned and adaptively adjusts the speed of the rotary actuators by slowing their movement for objects further from the scanner to increase point densities and speeding their movement for objects closer to the scanner to decrease unnecessarily high point densities.

In a second aspect of the present invention, the beam divergence is adaptively controlled based on the distance between the scanner and the object and the sensed geometry of the scanned surface. When the geometry sensed consists of noise due to the spot size and/or multiple returns on the photodiode, the focal length is varied to reduce the divergence and increase the precision of the range measurement. In an embodiment of this aspect of the present invention, a tunable focal length soft liquid lens may be used to control the beam divergence.

A third aspect of the present invention includes a method of adaptively positioning a scanner within a three-dimensional scene. A computational method is used to identify an optimal next position for the scanner based on the current position of the scanner and the scan data produced from that point of the scene. The positioning method takes into account both known features and the occluded areas of the scene.

A fourth aspect of the present invention includes a method of detecting occluded areas of the scene. The method analyses the distance of each data point from the scanner to identify pairs of adjacent points having distances that differ by a threshold value. This aspect of the invention also includes a geometric method for establishing the threshold value based on the scan pattern analysis. The scan pattern analysis incorporates the scanner specifications and operational modes. Occlusion boundaries are estimated based on the positions of such pairs.

A fifth aspect of the present invention includes a method for registering the scan data (as referred to as a point cloud) generated from various scan positions to a comprehensive mathematical model of the scene. Such registration methods are also be referred to as 3D or 4D stitching and 3D panorama generation. Computational methods used in the registration method operate on a four coordinate system: three positional coordinates and fourth coordinate corresponding to the hue of the scene at the measured point.

A sixth aspect of the present invention includes a method for determining best scan positions for generating a series of scans based on analysis of the scene in previous scans. Each next scan position is determined by adaptively analyzing the scene in terms of both the area covered by the scan and identification of occluded areas that need to be filled. The next scan position determination methodology consists of algorithms for registration of individual scans into a global map, detection of occluded areas, establishment of frontiers and scanner blind spots and computation of next best vantage points.

Other aspects of the present invention include hardware and algorithms for implementing the aforesaid aspects of the invention.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Scene Adaptive Mechanism Control

Embodiments of the present invention are described hereinafter in connection with 3D LIDAR scanners. It should be understood, however, that the following description is only meant to be illustrative of the present invention and is not meant to limit its scope, since the invention is applicable to other types of scanners. Further, 3D LIDAR scanners, also known as LADARS, may be operated in a variety of modalities, including, but not limited to: mono-static, bi-static configurations; direct measurement or heterodyned (coherent) measurement modes; and modalities that use phase, time of flight, Doppler shift or other signals, or stereo cameras, to determine the range and/or velocity of an object. The present invention is applicable to all of these modifications.

Figure 9:
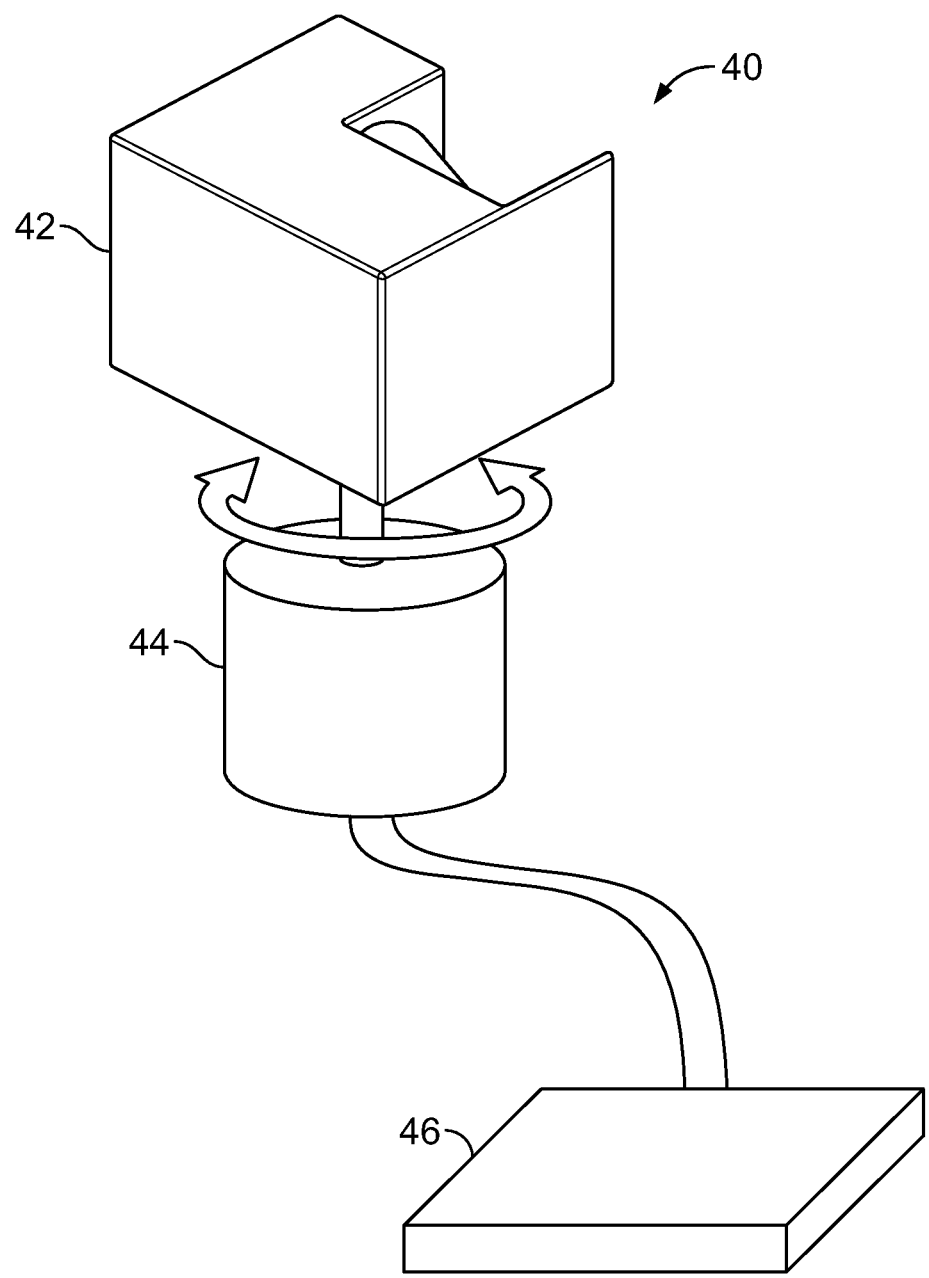
FIG. 9 is a schematic diagram of a first LIDAR scanner assembly, according to an embodiment of the present invention.

FIG. 9 illustrates a 3D LIDAR scanner assembly 40 constructed in accordance with an embodiment of the present invention. The 3D LIDAR scanner 40 includes a LIDAR scanner 42 connected to a variable rotational speed rotary actuator 44. One method that may be used to control the rotational speed of the rotary actuator 44 is electronic control, such as pulse width modulation (PWM) implemented using an electronic controller, such an electronic controller 46.

To improve the velocity tracking accuracy of the rotary actuator 44, additional mechanisms can be implemented to help minimize tracking errors that may occur due to the rotational inertia within the LIDAR scanner 40.

Figure 10:
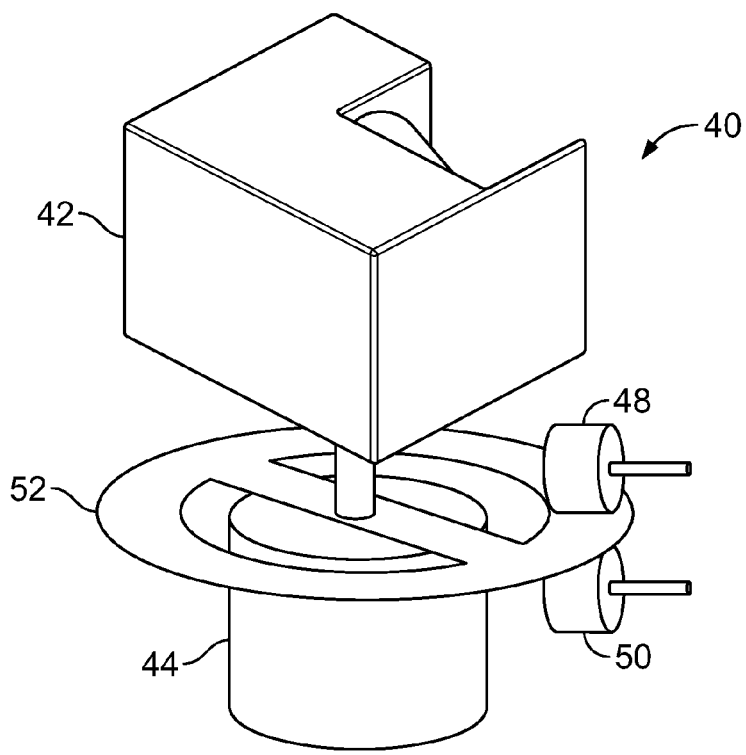
FIG. 10 is a schematic diagram of a second LIDAR scanner assembly, according to an embodiment of the present invention.

FIG. 10 depicts a modification to LIDAR scanning assembly 40, in which adjustable mechanical rotational resistance is applied to the actuator 44 by friction rollers 48, 50 acting on a disk 52 so as to enhance the control of the rotary actuator 44. Mechanical rotational resistance is controlled by moving the friction rollers 48, 50 toward each other to increase resistance, or away from each other to decrease resistance. The resistance changes produce fine control of the angular rotational speed between two rotational angles. The rotational angles where the speed is controlled correspond the range differences perceived in the scene.

Figure 11:
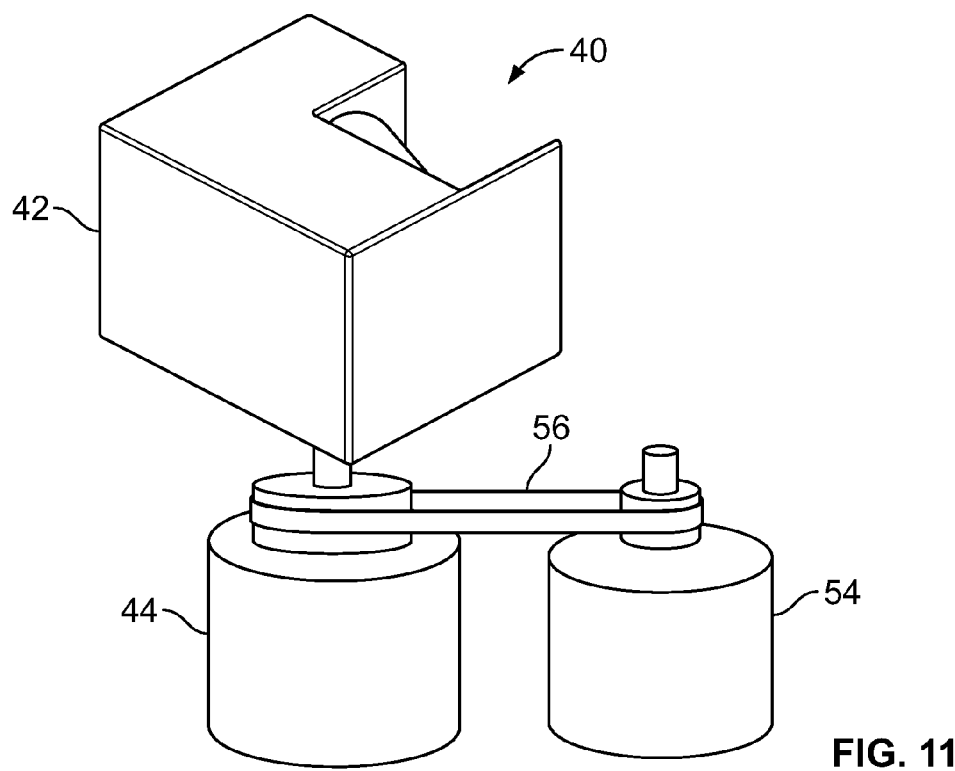
FIG. 11 is a schematic diagram of a third LIDAR scanner assembly, according to an embodiment of the present invention.

FIG. 11 depicts another modification to LIDAR scanning assembly 40, in which a controllable electro-magnetic induction element 54 having a belt drive 56 is used to provide magnetic rotational resistance for enhancing the control of the rotary actuator 44. Other rotary inertial assist devices, including, for instance, electrical, magnetic and/or mechanical mechanisms, may also be utilized to enhance speed control of the rotary actuator 44.

Figure 5:
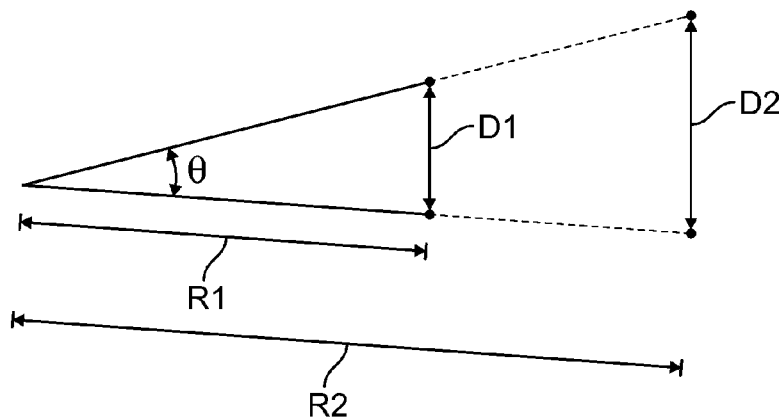
FIG. 5 is a diagram illustrating the effect of scanning range on the distribution of measurement points.
Figure 6:
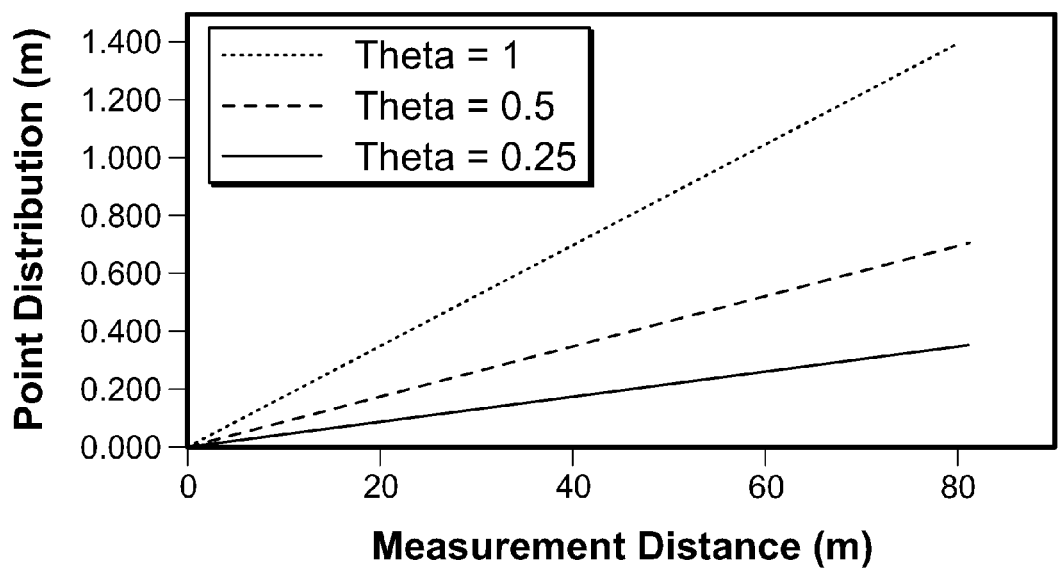
FIG. 6 is graph illustrating the effect of measurement distance on the distribution of measurement points for different angular displacements.
Figure 12:
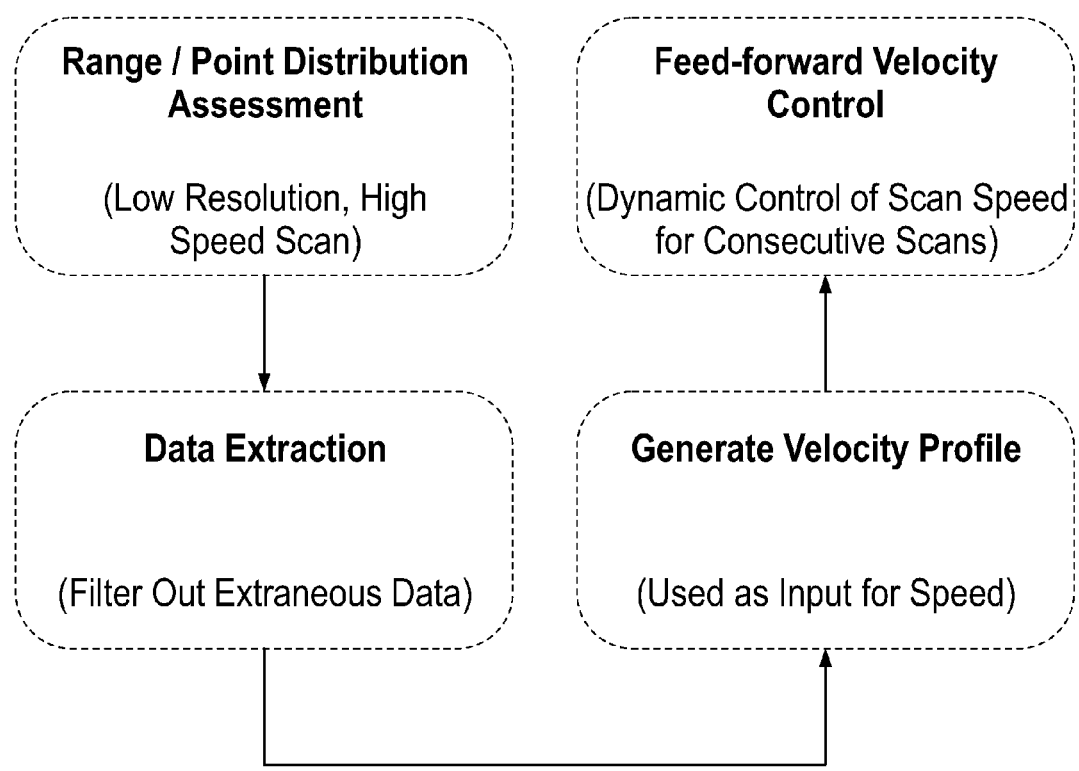
FIG. 12 is a flow chart showing steps in a method of scanning a scene, according to an embodiment of the present invention.

An embodiment of the present invention includes a method of measuring the range and/or point distribution of a 3D scan scene (not shown) and performs real-time speed control of the rotary actuator 44 to maintain a constant point distribution during a scan. The method is sensitive to the scanned scene and will control the speed of the rotary actuator 44 in relation to the distance R (as illustrated in FIG. 5) of the measured objects within the scene from the scanner. In this method, synchronized data from multiple sensors such as LIDAR distance ranger, angular position and speed sensors, and imaging devices (not shown) may be acquired simultaneously and processed during an initial quick scan of the scene. This data is used to determine the point distribution of the scene and to generate a velocity profile for the rotary actuator 44. The velocity profile indicates the changes in rotational velocity that are needed to provide a constant point density in the scanned image. Using this velocity profile as a reference, the rotational velocity of the rotary actuator 44 is controlled during subsequent scans performed immediately after the initial quick scan of the scene. The method adaptively adjusts the scan speed (i.e., angular resolution) of the rotary actuator 44 of the 3D LIDAR scanner 42 in real-time to match the scanned scene, and produce more uniform point densities regardless of the measurement distances R. Using this method, a more uniformly distributed point cloud can be produced with minimal scan time and file size. The process and steps used therein to control the speed of the rotary actuator 14 are depicted in FIG. 12. This process may also be used to adaptively control scan rates in the vertical plane, as well as the horizontal plane, during 3D scanning.

Figure 13:
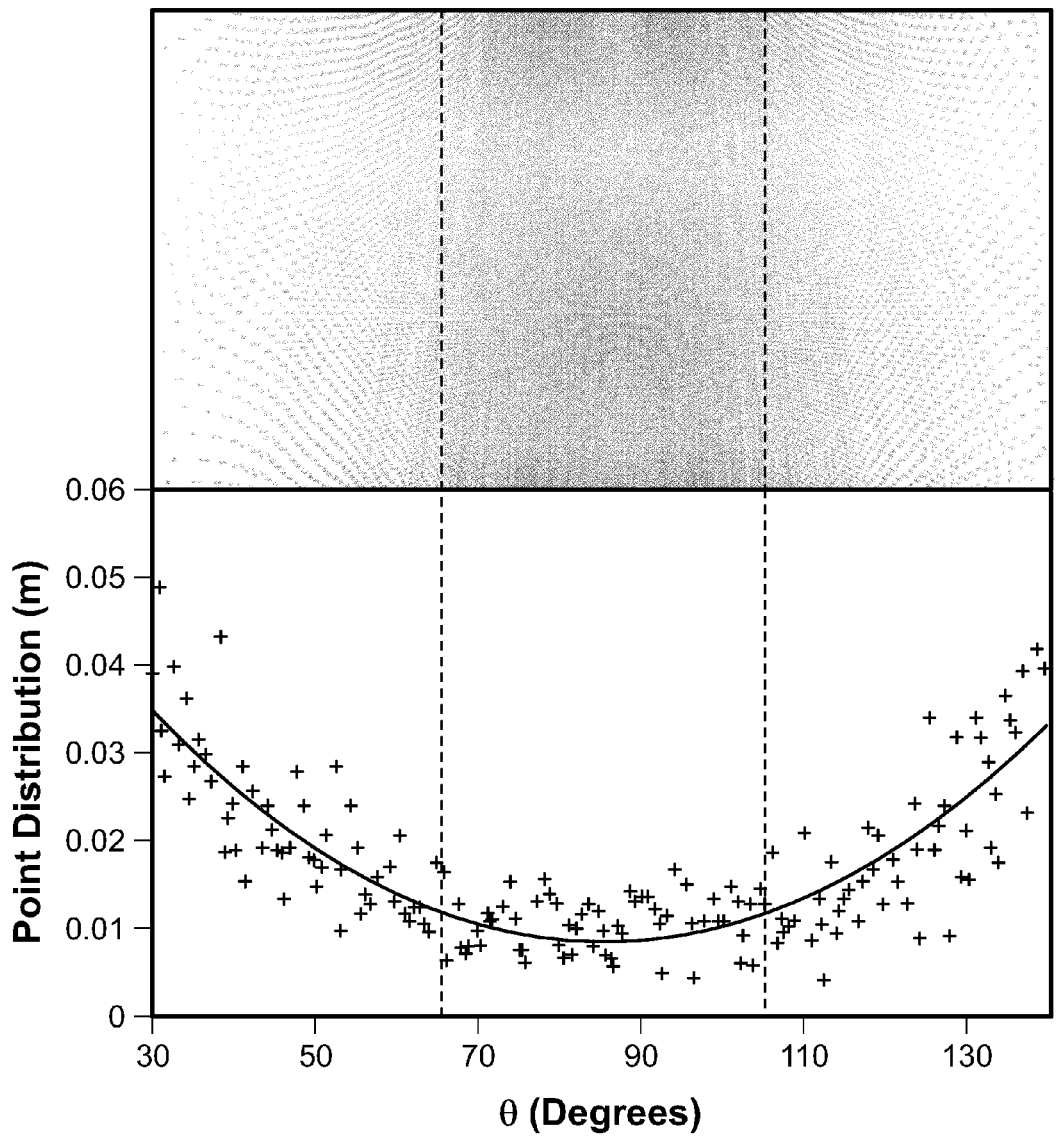
FIG. 13 is a point cloud map and a plot of the distribution of measured points from a constant speed scan.
Figure 14:
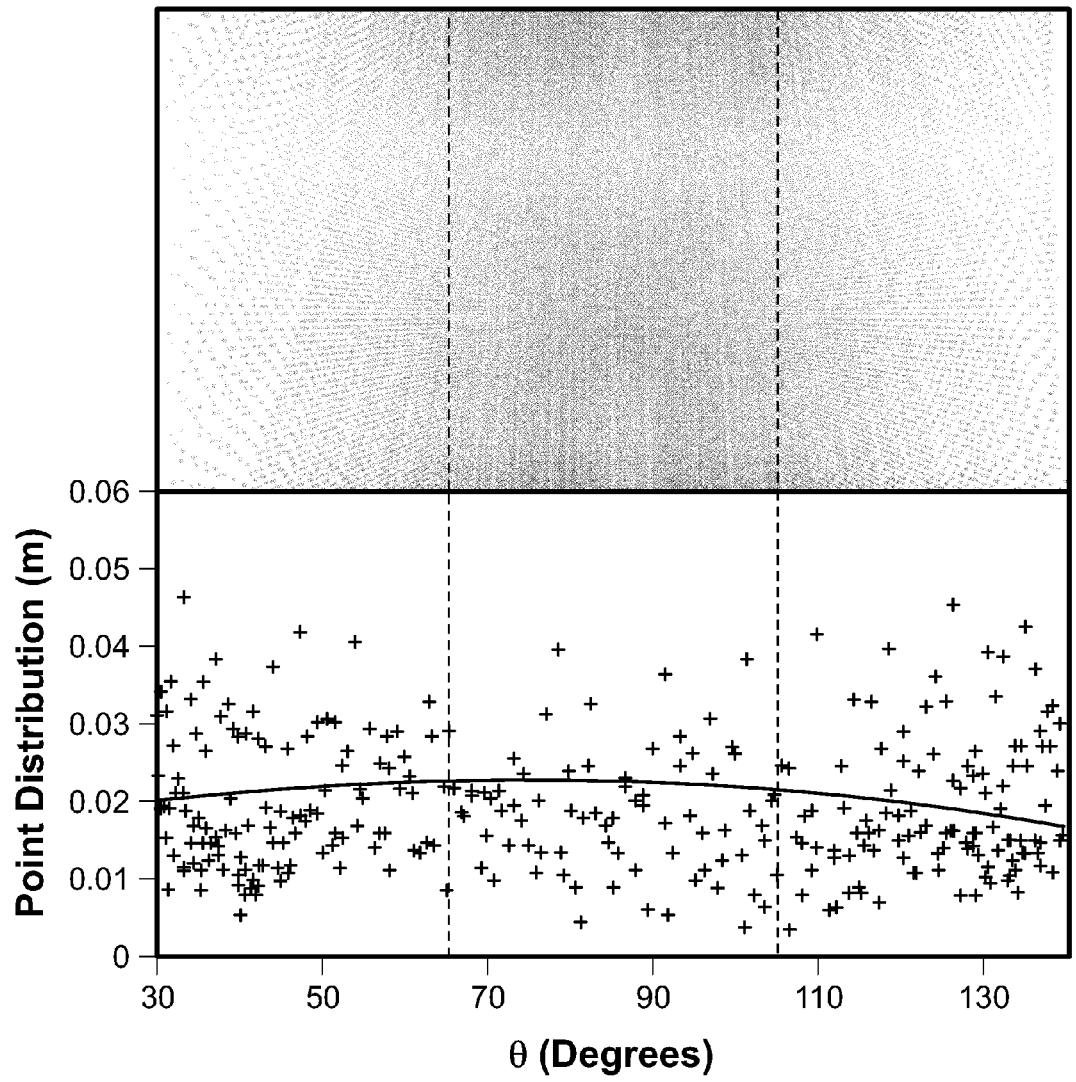
FIG. 14 is a point cloud map and a plot of the distribution of measured points from a variable speed scan, according to an embodiment of the present invention.

Referring to FIGS. 13 and 14, these figures reproduce point clouds generated using a constant scan speed (FIG. 13) and by varying the scan speed according to the variable-speed method described above (FIG. 14). In each figure, the point cloud is paired with a plot of the point distributions, positioned below its related point cloud image. The respective images of the point clouds and the plots have been divided into thirds by dashed lines for comparison of the variations in point distribution across the respective point clouds and with the plots of point distribution. For both figures, the scene that was scanned was a curved wall that bowed outward toward the scanner. FIG. 13 demonstrates that, for a constant scanning speed, the point distribution (i.e., the mean spacing between adjacent points) was much greater than the point distribution at the midpoint of the wall. FIG. 14 demonstrates that, for a variable speed scan, based on a velocity profile calculated from an initial high-speed, low-resolution scan, as discussed above, the point distribution is more evenly distributed across the point cloud.

Beam Divergence Management

Figure 7:
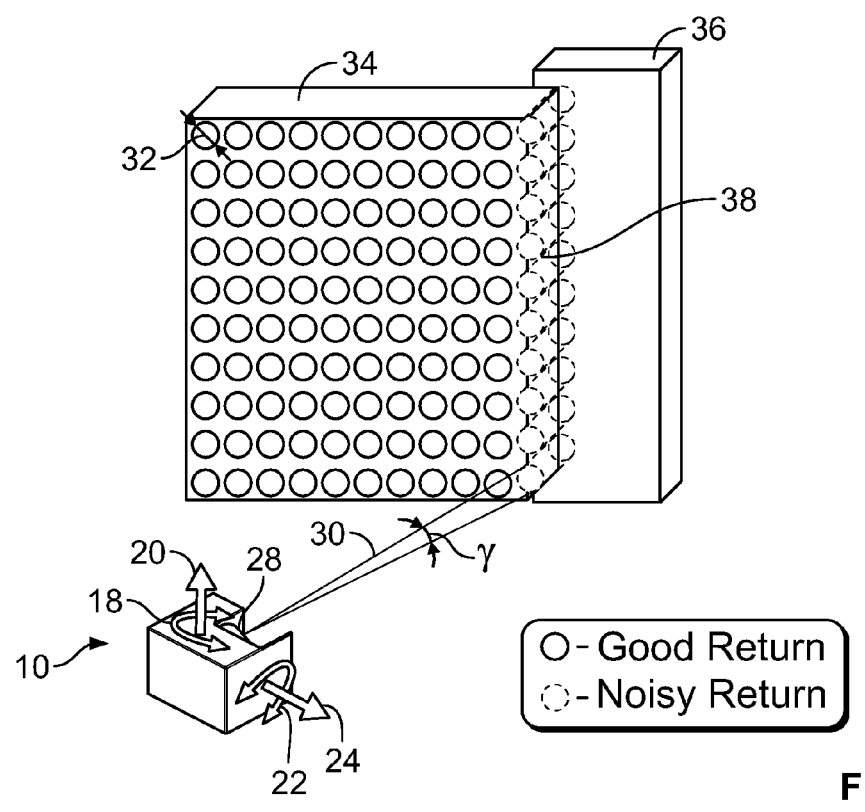
FIG. 7 is a schematic representation of a scanner scanning two objects, one of which partially occluded by the other.
Figure 8:
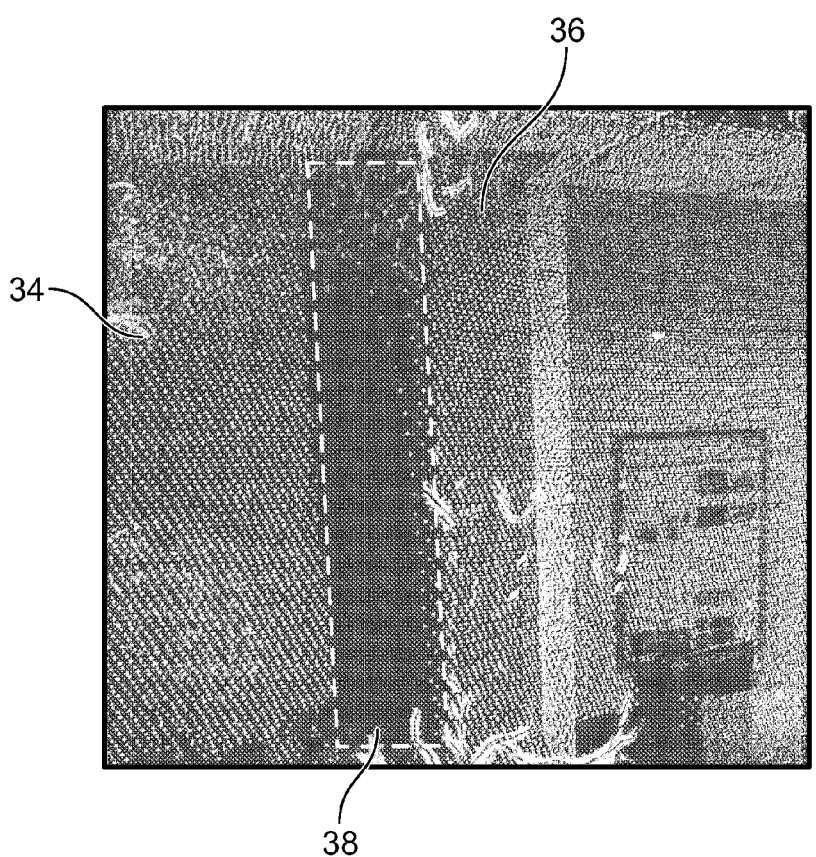
FIG. 8 is a reproduction of a point cloud generated from a scan showing an artifact of scanning a partially-occluded object.
Figure 15:
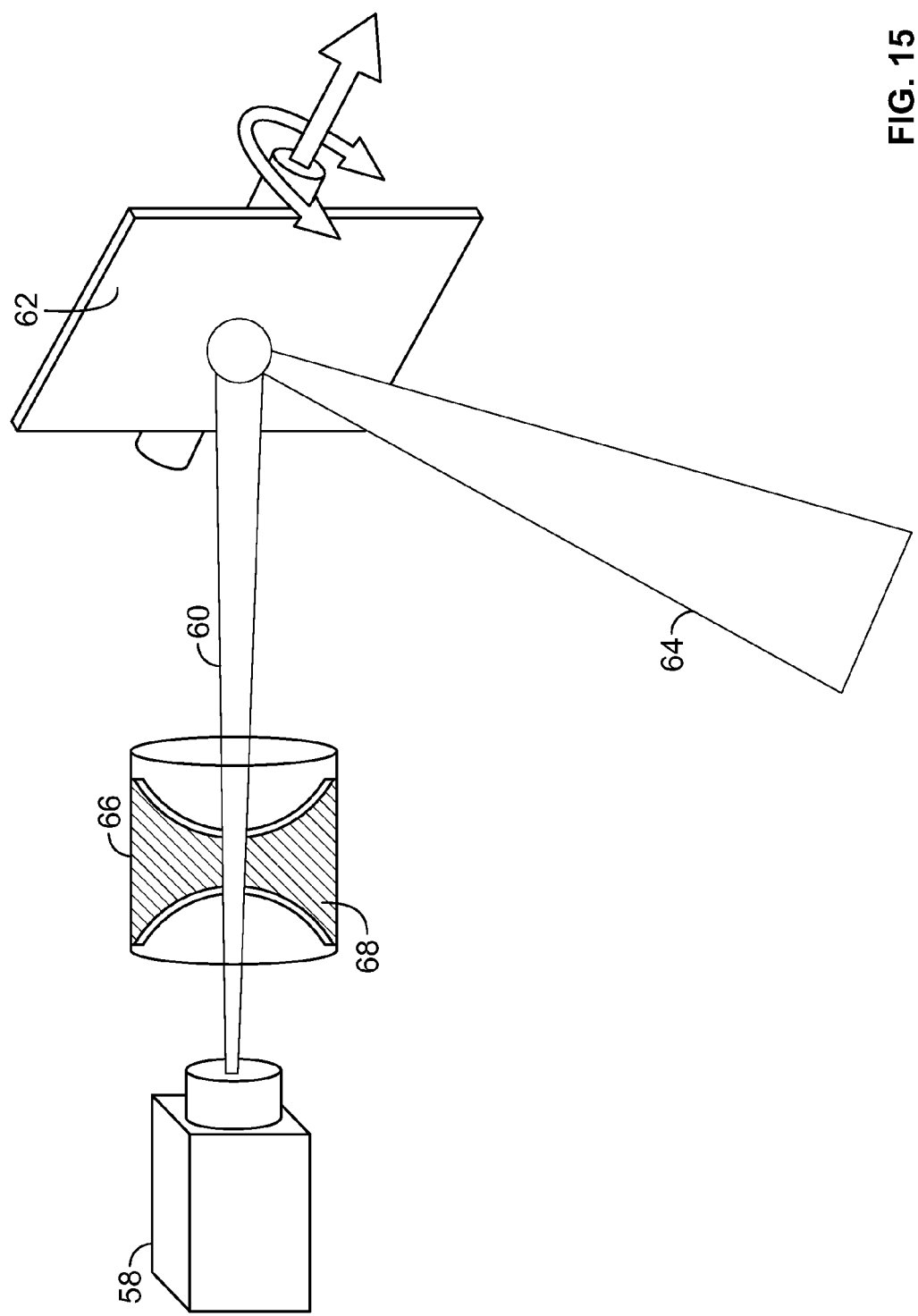
FIG. 15 is a schematic diagram of an apparatus for controlling the divergence of a laser beam, according to an embodiment of the present invention.

To minimize the noisy and erroneous pulse returns as depicted in FIGS. 7 and 8, the beam divergence of the emitted laser pulse may be controlled using an adjustable focal length lens. FIG. 15 is a schematic representation of a laser emitter 58, such as the laser emitter of a LIDAR scanner; the emitted laser beam 60; a rotary mirror 62, such as the rotary mirror of a LIDAR scanner; and a reflected laser beam 64, reflected from the rotary mirror 62. An adjustable lens 66 is inserted into the laser light travel path. In one embodiment of the present invention, the adjustable lens 66 may include an electro-mechanical system which physically adjusts the position of lens 66 within the assembly. In another embodiment of the present invention, the adjustable lens 66 includes a liquid lens element 68. The shape of the lens element 68 can be controlled using an electrical input signal. Such a liquid lens element may be an electrically tunable-focus liquid crystal (LC) lens capable of adjusting the focal length from several centimeters (cm) to infinity. In another embodiment, such a lens element 68 can be fabricated from polymer gels which can be actuated with electrical methods or mechanical forces to produce the necessary beam divergence. In another embodiment, the adjustable lens 66 can be manufactured with micro-electromechanical systems (MEMS) technologies with microfluidic pockets and chambers. MEMS technologies can create embodiments of the adjustable lens 66 with membrane, fiber and other structures to converge or diverge light paths as required.

When use of the nominal spot size and beam divergence results in multiple return beams from the scenes being scanned, the lens 66 is adjusted to focus a sharper beam onto the scene. The area of the scene with multiple returns is rescanned adaptively with a narrower beam divergence to precisely detect the geometric discontinuity in the scene. In one embodiment, the area is marked during the first scan and all such areas are rescanned with greater precision during a subsequent rotation of the scanner head. This adaptive scanning technique would typically require no more than three rotations of the scanner mechanism.

Scene-Adaptive Scanner Positioning

Figure 16:
FIG. 16 is the first of a series of four images illustrating the implementation a method for adaptively creating a global map of a three-dimensional scene using a scanner, according to an embodiment of the present invention.
Figure 17:
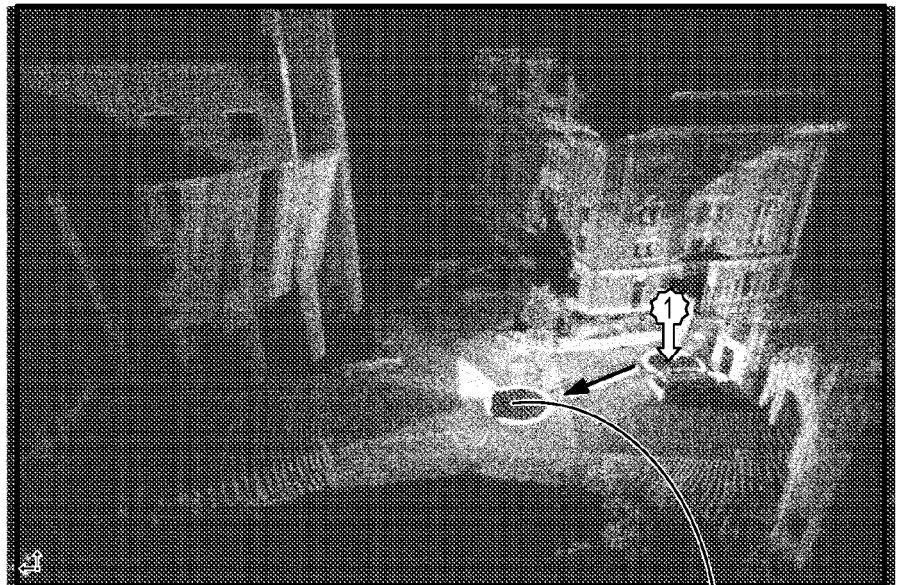
FIG. 17 is the second of a series of four images illustrating the implementation of the method of FIG. 16.
Figure 18:
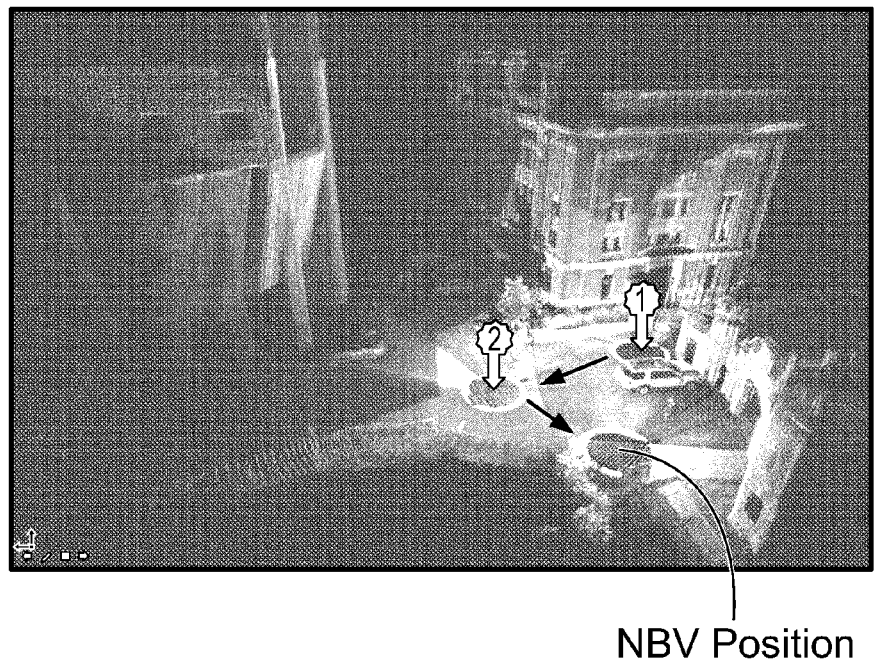
FIG. 18 is the third of a series of four images illustrating the implementation of the method of FIG. 16.
Figure 19:
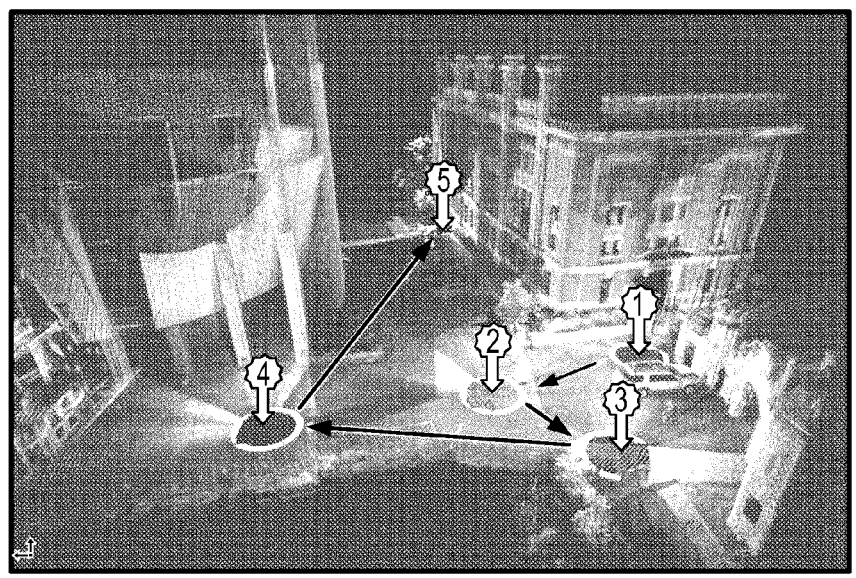
FIG. 19 is the fourth of a series of four images illustrating the implementation of the method of FIG. 16.

In an embodiment of the present invention, a method is provided for exploration and mapping of an unknown area. The exploration and mapping process is illustrated in FIGS. 16-19, which are a sequence of 3D maps illustrating the sequential mapping of a physical site, regarding which the mapping system has minimal to no prior data. The illuminated areas in each of FIGS. 16-19 represent the areas that have been mapped by the scanning process, and the numbered circular areas (numbered 1-5 on the illuminated areas within FIGS. 16-19) represent the sequenced positions from which the scanner has mapped the scene. FIG. 15 shows the 3D map from a first vantage position, which is used as a frame for global reference coordinates. A point cloud density and grid occupancy evaluation is performed to decide the Next Best Vantage (NBV) position (not numbered), which is illustrated in FIG. 16. After scanning is completed at the NBV position, the process is repeated to find the next NBV position, and the scan is taken from this next NBV position, which is illustrated in FIG. 17. This process is repeated until all the occluded areas are filled, as illustrated in FIG. 18. In order to accomplish this objective for exploration and 3D global map construction, three main considerations must be addressed: (1) unmapped space (i.e., blind spots, occlusions and frontiers of the field of view) must be identified; (2) 3D scans acquired from different vantage positions must be precisely registered so that a global 3D map may be constructed about a known reference point; and (3) the optimal NBV positions for the scanner must be determined so that the exploration process may be accomplished at the minimum cost and maximum completeness of the map.

Step 1: Detect Blind Areas and Areas of Occlusion in a Scan

Figure 20:
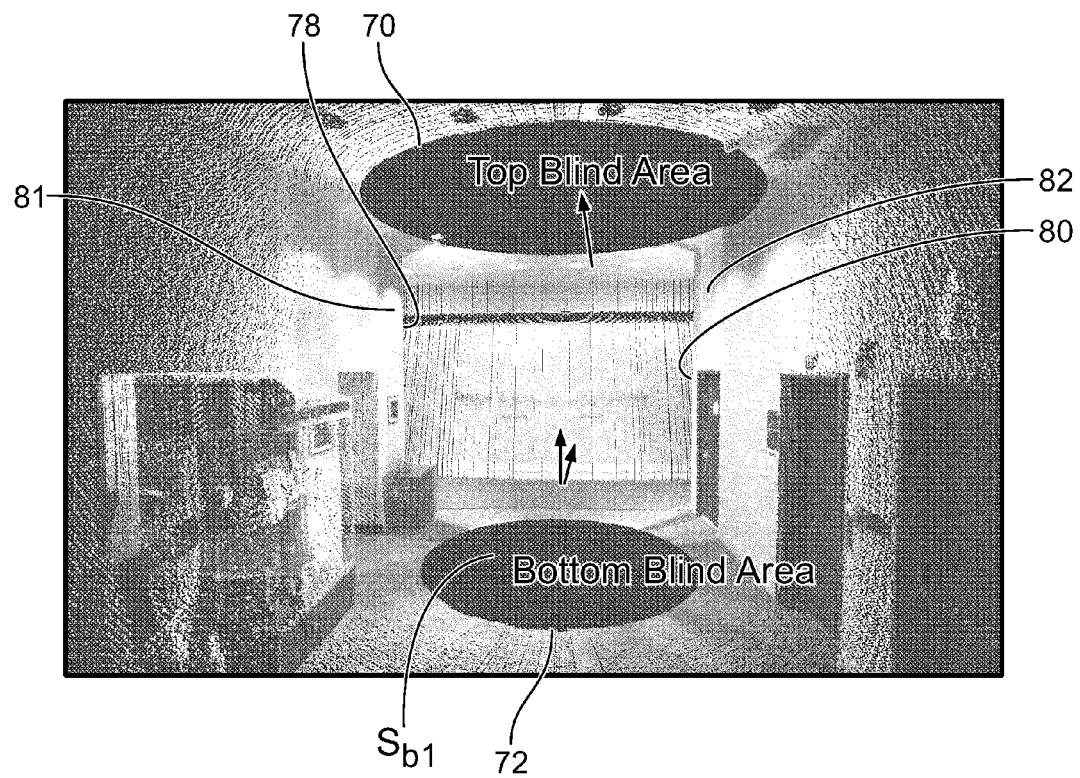
FIG. 20 is a point cloud map mimicking a scan of an indoor scene, according to an embodiment of the present invention.

FIG. 20 is a reproduction of a point cloud map of an indoor LIDAR scan. Blind areas occur because of limits to the scanner range and constraints on range of mirror rotation from which data can be stored. In an exemplary LIDAR scan, the highest resolution can be achieved when scanning between 40° and 100°. This leads to two blind zones in the scene when the scanner is mounted on a tripod: a top blind area 70 and a bottom blind area 72. If the distance from the scanner to ground is $h_1$, then blind zone area $S_{b1}$ is related to the scanner limit angle as:

$$S_{b1} = \pi (h_1 \tan(40°))^2 \quad (1)$$

A typical scan generated indoors with such a scanner has a blind zone $S_{b1}$ with a radius of about 2.6 m.

Figure 1:
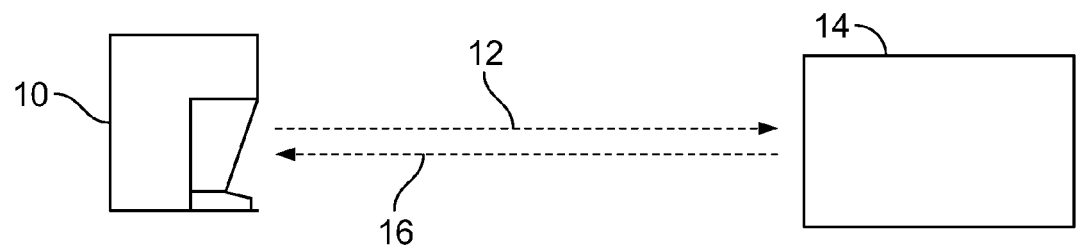
FIG. 1 is a schematic representation of a light detection and ranging (LIDAR) scanner scanning an object.
Figure 2:
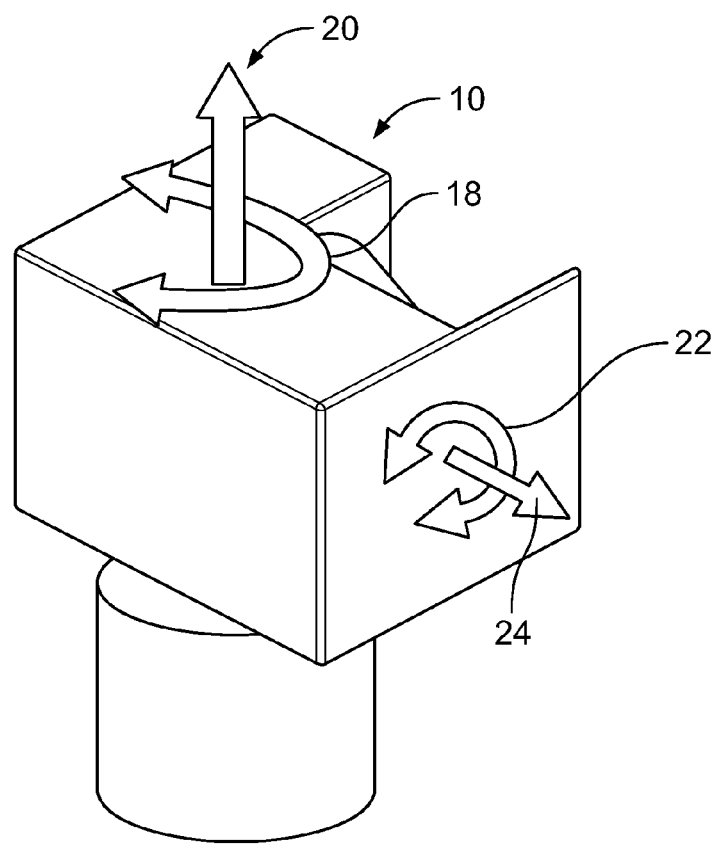
FIG. 2 is a schematic representation of a LIDAR scanner for scanning in three dimensions.
Figure 3:
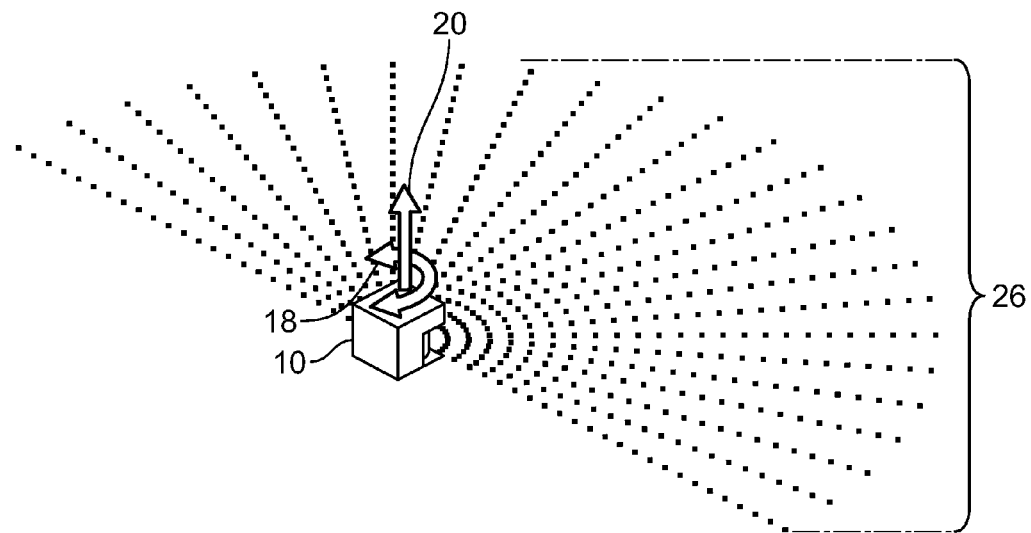
FIG. 3 is a schematic representation of a LIDAR scanner scanning in two dimensions.
Figure 4:
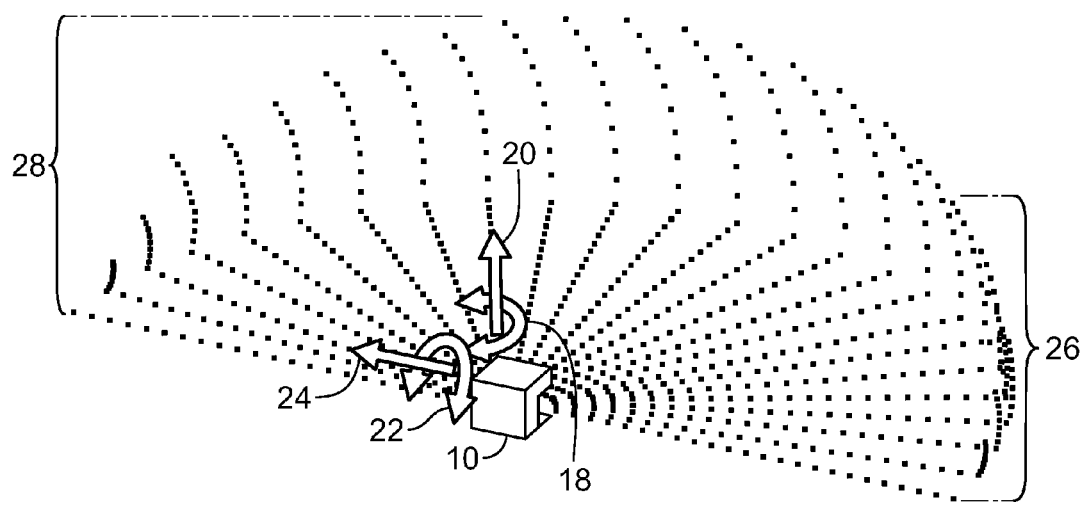
FIG. 4 is a schematic representation of a LIDAR scanner scanning in three dimensions.

As discussed above with reference to FIGS. 4 and 5, occlusions appear when one object closer to the LIDAR scanner blocks the path of the laser ray to other objects and surfaces behind it. Both blind areas and occlusions can be identified by mathematical analysis of point cloud data. For example, in FIG. 20, areas at the left and right of the scene (hidden, but indicated by reference numbers 78 and 80) are occluded by the visible walls 81 and 82.

Figure 21:
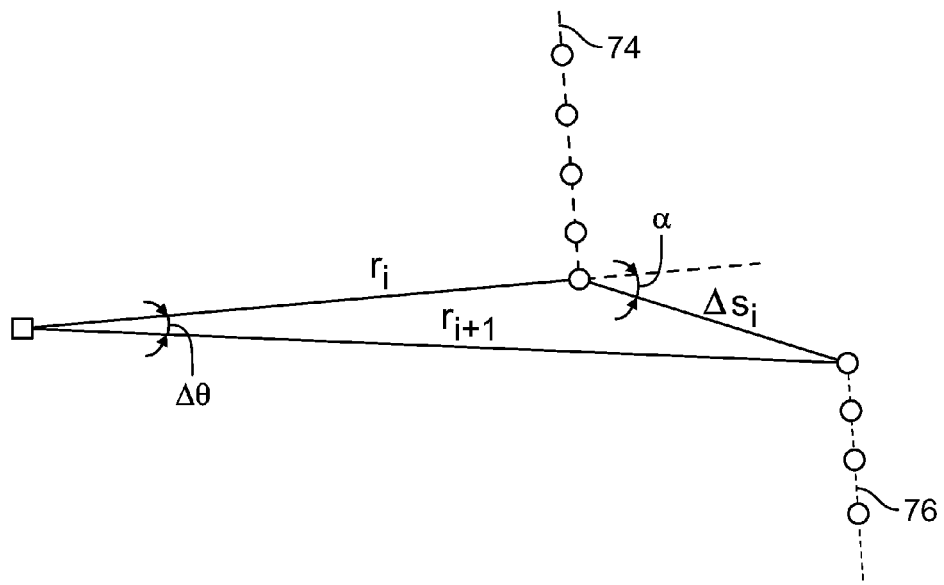
FIG. 21 is a diagram illustrating an aspect of an occlusion detection method, according to an embodiment of the present invention.

In an embodiment of the present invention, the point cloud data is organized as a form mimicking the pattern generated by the scanner during its scan of the scene. In this organization, the neighborhood points for given point $p_{i,j}\{r_{i,j}, \theta_i, \phi_j\}$ are the four points $p_{i+1,j}, p_{i-1,j}, p_{i,j+1}$ and $p_{i,j-1}$, denoted as the north, south, east and west neighbor points, respectively. The occlusion detection algorithm relies on the scanner point pattern and the expectation of the object surface characteristics. Referring to FIG. 21, the distance $\Delta s_i$ between the $i^{th}$ point and $i+1^{th}$ point is utilized to identify whether the $i^{th}$ point is located on an occlusion boundary on the LIDAR scanning plane. FIG. 21 shows the schematic of a typical range difference between two points. Points on an occlusion boundary have a large $\Delta s$ at a range discontinuity, as sensed by a LIDAR scan. However, the point spacing is a function of the range (i.e., $\Delta s_i$ is a function of $r_i$ and $r_{i+1}$ as well as the scan position angles ($\theta$ and $\phi$)). FIG. 21 shows that the geometric relationship between $\Delta s_i$, $r_i$ and $r_{i+1}$. $\Delta \theta$ is a constant, e.g. 0.25°, and can be determined by the scanner resolution specifications. The distance between neighboring points is determined by range difference as:

$$\Delta s_i = \frac{r_i \sin(\Delta \theta)}{\sin(\alpha - \Delta \theta)} \quad (2)$$

Since $\Delta \theta$ is determined by LIDAR resolution at 0.25° on the North-South direction, a value for $\alpha$ close to $\pi/2$ is expected for flat surfaces. However, at the range discontinuity, $\alpha$ becomes very small and can be applied to identify occlusions.

In an example of an occlusion detection method of the present invention, it is assumed that, when the object surface angle is detected as 5°, the point is on an occlusion boundary. In the event that the $\alpha$<5 in the scene, the diameter of the laser spot is large and the reflection is obtained from two surfaces (e.g., the Plane #1 (74) and the Plane #2 (76) of FIG. 21). In such a case, the measured point may have a large error. In either case, the area in question must be rescanned. The point cloud map of FIG. 20, previously identified, shows the point spacing cut off and the points sorted as those in occluded boundaries $$\left(\frac{\Delta s_i}{r_i}\right)$$

and those within the surfaces.

Figure 22:
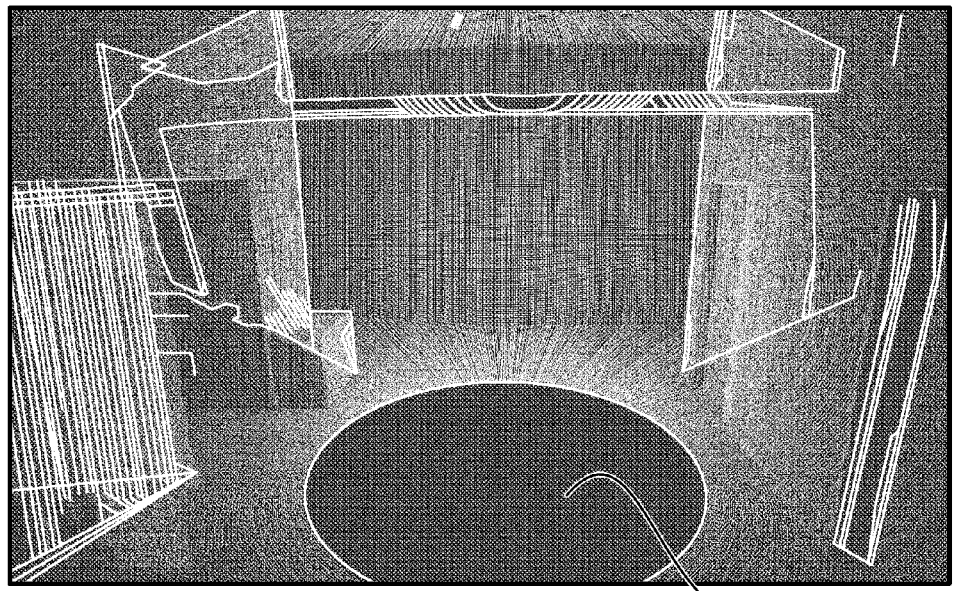
FIG. 22 is a point cloud map mimicking the scan of FIG. 20, showing boundaries of occlusions detected by the method of FIG. 20.
Figure 23:
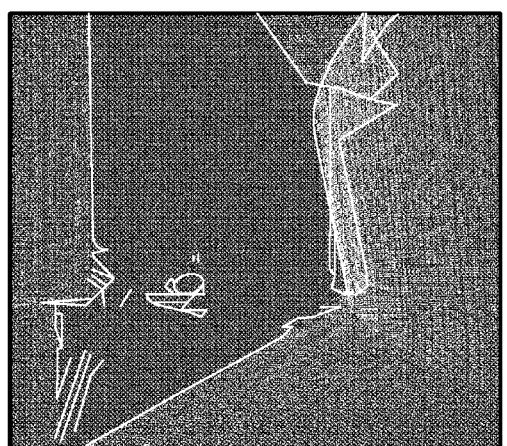
FIG. 23 is a point cloud map mimicking a portion of the scan of FIG. 20, showing boundaries of occlusions detected by the method of FIG. 20.
Figure 24:
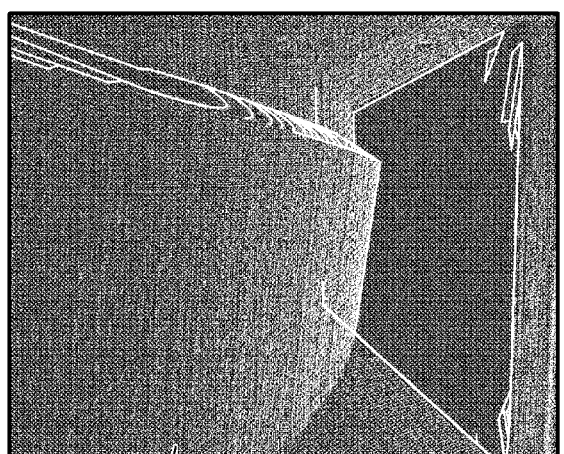
FIG. 24 is a point cloud map mimicking another portion of the scan of FIG. 20, showing boundaries of occlusions detected by the method of FIG. 20.

Combining occlusion detection in both the north-south and west-east directions, the occlusion boundaries may be extracted from the 3D point cloud reproduced in FIG. 20. Blind area 72 is delineated in white in FIG. 22. Occluded areas 78,80 at the left and right, respectively, of the point cloud of FIG. 20, are delineated in white on FIGS. 23 and 24.

Step 2: Register Two Scans into a Map with a Global Reference Point

A Hue-assisted Iterative Closest Point (HICP) algorithm, according to an embodiment of the present invention, brings color attributes from imagery into the scan registration process. The HICP algorithm applies the hue value from the camera to increase the accuracy of point association and accelerate the registration process. The major time and computation cost during a conventional Iterative Closest Point search (ICP) is finding the correct point pairs. The conventional ICP algorithm cannot resolve ambiguities under certain geometric conditions. For example, when two planes are being associated, the registration is not unique. Variations in the hue perceived the imaging system helps resolve the geometric ambiguities. We use the hue component from the color information (r,g,b) as this was found to be invariant with the camera angle and lighting conditions. The nearest neighbor distance computation in 3D space can be expanded into 4D space by adding a weighted hue value as the fourth dimension. By integrating the hue value into the closest-point search, the accuracy of point association can be improved.

Both the hue attribute and range value from the range measurement are combined in the variant as $\{x_o, y_o, z_o, h_w\}$ for point association in the HICP algorithm. $x_o, y_o, z_o$ are the original coordinate values from a scan of the scene with distance units and $h_w$ is the weighted hue value. Hue values are normalized from 0 to 1 and must be weighted during the closest point search in the 4D space. In order to normalize the coordinates, the bounding box for each map segment is calculated and the coordinate space is rescaled to a 0-1 range. The normalized variant for point association is $\{x, y, z, h_w\}$, where $x=x_o/r_x$, $y=y_o/r_y$, $z=z_o/r_z$. $r_x$, and $r_y$, $r_z$ are the dimensions of the bounding box in the x, y, z directions.

If $m_i=\{m_{ix},m_{iy},m_{iz}\}$ represent the coordinates of the $i^{th}$ point in the model point cloud and $d_j=\{d_{jx},d_{jy},d_{jz}\}$ are coordinates of the $j^{th}$ point in the associated or paired point set, a distance error is defined as:

$$E(R, T) = \frac{1}{N}\sum_{i=1}^{N}\|m_i - (Rd_i + T)\| \quad (3)$$

Centroids are computed for the associated points in both model and data point clouds as shown in Equation 4 below. The coordinates are translated to have the origin at the centroid as given in Equation 5 below. An orthonormal transformation matrix of associated points can be constructed (Equation 6 below). Rotation R and translation T are decoupled. Using Singular Value Decomposition (SVD), R can be solved from the orthonormality matrix (Equation 7 below). Translation T is computed based on the translating the centroids of model and data point sets (Equation 6).

$$\overline{m} = \frac{1}{N}\sum_{i=1}^{N}m_i, \overline{d} = \frac{1}{N}\sum_{i=1}^{N}d_i \quad (4)$$

$\overline{m}=\{\overline{m}_x, \overline{m}_y, \overline{m}_z\}$ and $\overline{d}=\{\overline{d}_x, \overline{d}_y, \overline{d}_z\}$ are the centroids of associated points in model and data point clouds. N is the total number of associated points. The coordinates after transformation are:

$$m'_i = m_i - \overline{m}, d'_i = d_i - \overline{d} \quad (5)$$

$m'_i=\{m'_{ix},m'_{iy},m'_{iz}\}$ and $d'_i=\{d'_{ix},d'_{iy},d'_{iz}\}$ are the $i^{th}$ associated point about the transformed coordinate system. The orthonormality matrix H can be constructed based on $m'\{m'_i, i=1\ldots N\}$ and $d'\{d'_i, i=1\ldots N\}$.

$$H = \begin{bmatrix} S_{xx} & S_{xy} & S_{xz} \\ S_{yx} & S_{yy} & S_{yz} \\ S_{zx} & S_{zy} & S_{zz} \end{bmatrix} \quad (6)$$

Where $$S_{xx} = \sum_{i=1}^{N}m'_{ix}d'_{ix}, S_{yy} = \sum_{i=1}^{N}m'_{iy}d'_{iy}, S_{zz} = \sum_{i=1}^{N}m'_{iz}d'_{iz}$$

$$S_{xy} = \sum_{i=1}^{N}m'_{ix}d'_{iy}$$

Singular value decomposition is performed for the H matrix to determine the rotation matrix R, that minimizes the distance error $\epsilon=E(R,T)$ as:

$$H = U\Lambda V^T \quad (7)$$

Where optimal rotation $R=VU^T$. The translation T can be calculated as:

$$T = \overline{m}^T - R\overline{d}^T \quad (8)$$

The Hue-assisted ICP algorithm is an iterative process entailing the following steps:

(1) Estimate the initial values for the matrices R and T that transform points in the data point cloud into the model point cloud's coordinate system; The initial estimate can come from course alignment techniques and may not always require manual intervention or use of course positioning devices.

(2) Construct k-d tree of model point cloud $M_{\{}m_1,m_2, m_3 \ldots m_M\}$, with weighted hue value as the fourth dimension; The K-D tree and caching methods speed up searching and sorting of matching points during a nearest neighbor search.

(3) While merging error $\epsilon$>preset tolerance (a) Use R and T to transfer data point cloud $D\{d_1,d_2 \ldots d_N\}$:

$$\overset{uv}{D} = R\overset{uv}{D} + T$$

(b) Perform Nearest Neighbor Search Step, as follows:
For i=1 to Number of points in the data point cloud
Set Number of Associated Points N=0
Search closest point for point $d_i\{d_{ix}, d_{iy}, d_{iz}, d_{ih}\}$ in model k-d tree if closest point $m_j$ exists within a specified search range, Then, associate $d_i$ and $m_j$ as $\{d_k, m_k\}$; and Increment number of associated points: N++;
End If
End For (c) Distance error Computation: For each associated point pair, calculate normalized mean square root distance $\epsilon$ as error, $$\varepsilon = \frac{1}{N}\sum_{i=1}^{N}\sqrt{(d_{ix} - m_{ix})^2 + (d_{iy} - m_{iy})^2 + (d_{iz} - m_{iz})^2}$$

(d) Solve for R and T that minimize the error $\epsilon$:
Construct orthonormality matrix H (Equation 4) and solve rigid rotation R and translation T (Equation 7&8);
End While (4) Post-Registration error estimates:
Compute any post registration errors such as planarity or curvature continuities.

Convergence Criteria:
Three separate criteria are established for convergence of the HICP iteration. First, a measure called the association stability is applied. Association stability(S) is defined as the number of points that changed their paired points in the previous iteration of the ICP algorithm. A large value of S indicates that the point association is not stable and a small or zero value indicates that the point pairing has stabilized. Second, the convergence of number of points associated during the nearest Neighbor Association Search is used. The third convergence criterion used is the change in error $\epsilon$. The HICP algorithm is terminated when the three measures converge, as follows:

a) Association stability measure: S→0.
b) Number of newly associated points: ΔN→0
c) Error value: $\epsilon$→0

Figure 25:
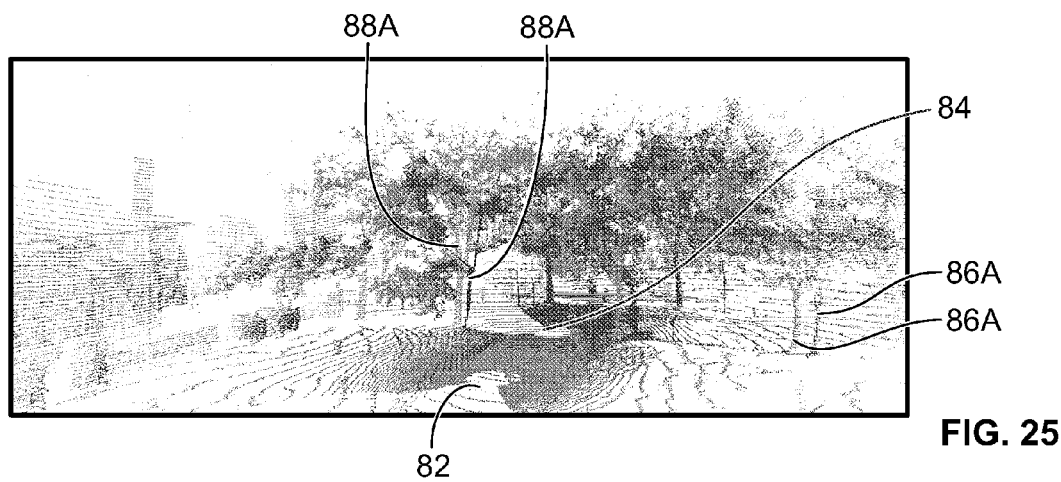
FIG. 25 is a representation of superimposed point cloud maps generated from scans of a three-dimensional scene made at two different observation points according to an embodiment of the present invention.
Figure 26:
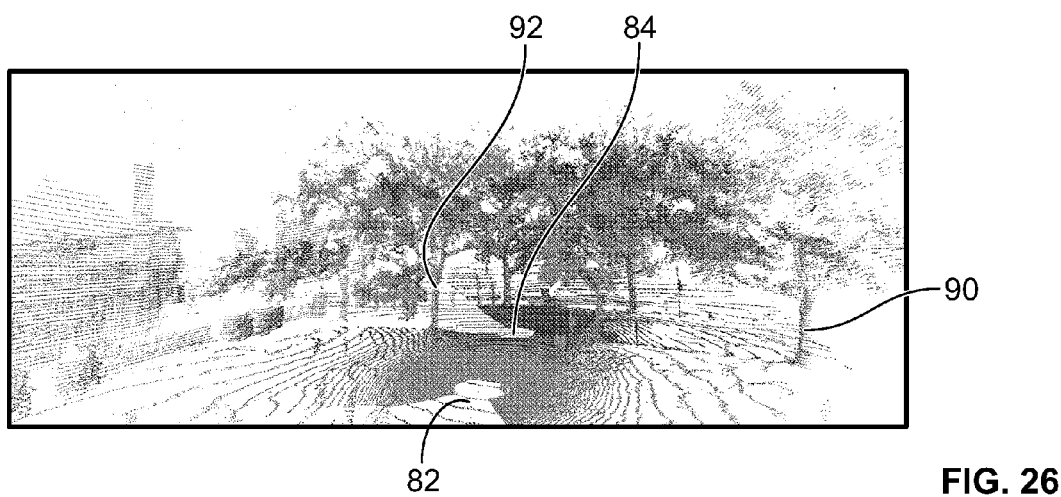
FIG. 26 is a point cloud map resulting from the registration of one of the point cloud maps of FIG. 25 onto the other point cloud map of FIG. 25, according to an embodiment of the present invention.
Figure 27:
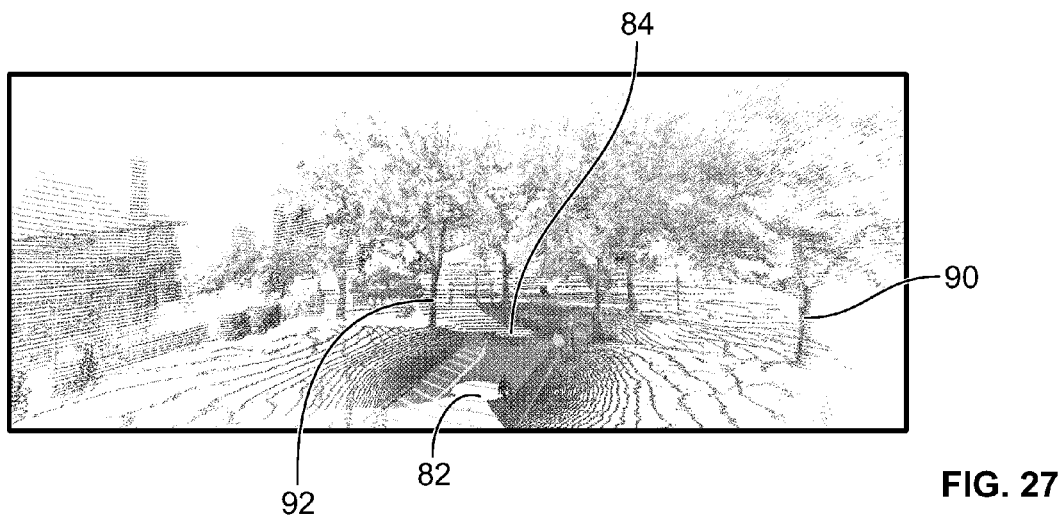
FIG. 27 is the point cloud map of FIG. 26, further representing the hues of measured at each point of the scan, according to an embodiment of the present invention.
Figure 28:
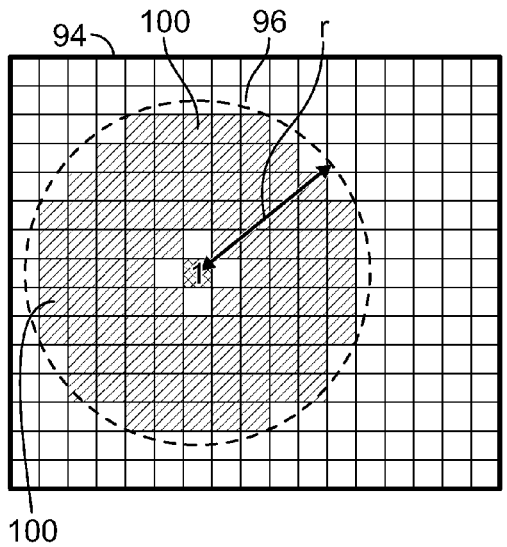
FIG. 28 is the first of a series of four diagrams illustrating a method of adaptively positioning a scanner within a scene, according to an embodiment of the present invention.

HICP algorithms have been applied to construct outdoor maps. Color point clouds taken from eight different vantage positions are registered pair-wise to construct the map. The map contains a complex scenes with trees, roads, electrical poles and buildings. Map segments generated from consecutive vantage positions are registered sequentially. FIG. 25 is a reproduction of a point cloud of a complex scene generated from two vantage positions 82, 84, before registration. The paired images of trees are shown labeled as 86A, 86B and 88A, 88B originate from separate images of the same two trees, as scanned from different vantage positions. FIG. 26 is a reproduction of the same scene after registration. It can be seen that tree images 86A, 86B have been resolved into tree image 90 and tree images 88A, 88B have been resolved into tree image 92. FIG. 27 is a reproduction of the registered point clouds of FIG. 26 with color information mapped from the two scans. Association of color information has brought out additional details of the scene.

Step 3: Evaluate the Area to be Scanned for Next Best Scan Position

An efficient exploration strategy is then applied to position the scanner during the mapping process, which is explained herein with reference to FIGS. 28-31. The steps of this method may be performed on mathematical representations of the areas to be mapped (e.g., grid map 94). The perimeter 96 observed in the map 84 covered from a single position (shown as "1" in FIGS. 28-31) is taken to be a. Given the range r of the laser range scanner, a maximum area of $a=2\pi r$ can be mapped. However, occlusions and blind spots limit the area that is actually mapped. Each scan comprises a set of points that represent the outline of the world objects within the range r of the laser range scanner. The blind zones and occlusions need to be filled by point cloud maps from other vantage positions. The exploration process is designed to ensure generation of a complete map with sequential location of multiple viewpoints. Minimum cost path for traversal of the mapper is also an objective for the Next Best Vantage Point (NBV) selection.

A frontier-based exploration strategy is employed for determining the next best vantage point. The objective of frontier-based exploration is to move the scanner to frontiers between explored and unexplored areas. The NBV point always remains within the currently mapped area but may not always be in the area most recently scanned. A movable scanner (e.g., a mapping robot equipped with a scanner) is expected to travel by the shortest trajectory to the NBV point and acquire most information about unexplored space during the next scan. A perception of the constraints in the mapping area is required to ensure that the navigation to NBV point is feasible and the NBV point is accessible from the current point. Also, the NBV point must be selected to cover occlusions in the current point cloud map.

In order to determine a set of candidate NBV points and to select the optimal NBV point from this set, an occupancy grid method is utilized for evaluation of map coverage (FIGS. 28-31). The next best vantage position is determined on the frontier, considering both maximum occlusions coverage and optimal travel cost. The travel cost to a candidate position on frontier (e.g., the perimeter 96 of the scanner range r at the current observation point), is computed by a shortest path determination algorithm, such as the well known D* algorithm. Other suitable algorithms are known in the art. Once the next vantage position is determined and all objects in the current scene are explored, the scanner is moved to the next vantage position. This process is continued until the global map has been constructed.

The algorithm for selecting the next best vantage position can be described with reference to FIGS. 28-31.

Figure 29:
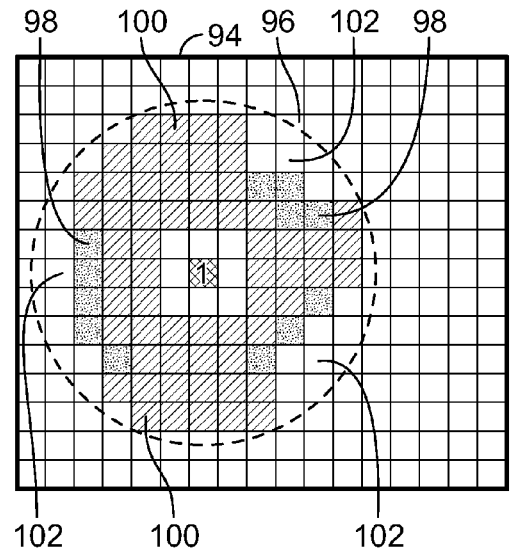
FIG. 29 is the second of a series of four diagrams illustrating the method of FIG. 28.
Figure 30:
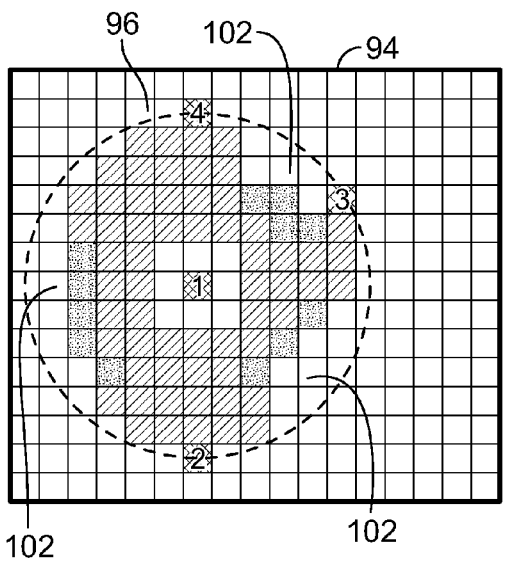
FIG. 30 is the third of a series of four diagrams illustrating the method of FIG. 28.
Figure 31:
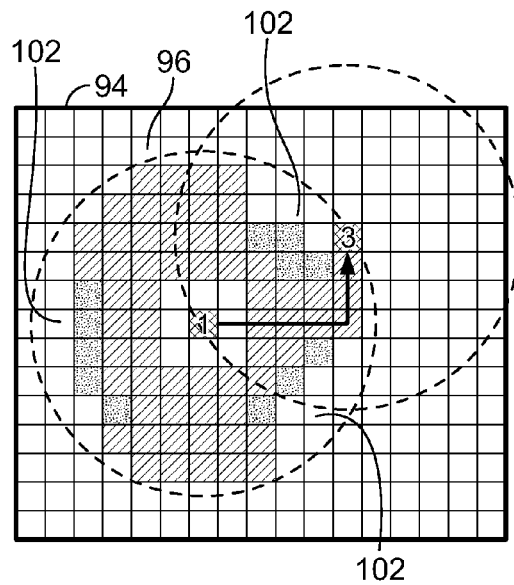
FIG. 31 is the fourth of a series of four diagrams illustrating the method of FIG. 28.

1. Initialize grid occupancy of the mapping area (e.g., occlusions, represented by stippled grid cells, such as cells 98, and traversable cells, represented by hatched grid cells, such as cells 100);
2. After mapping at current vantage position, update the global grid occupancy (FIG. 29). The previously described HICP algorithm is employed in this step;
3. Determine the set T of traversable cells 100 based on the grid occupancy map or traversable map, by the steps of:
   (a) Determine the set R of reachable cells based on D* algorithm (hatched cells 100 and open cells, such as cells 102);
   (b) Determine the set O of cells covering occlusions in the current global map (stippled cells 98);
   (c) Determine the vantage position candidates set C of cells that are reachable and traversable by $$C = \{c^{[xy]} | c^{[xy]} \in T \cap R \cap O\} \quad (10)$$

4. Determine the next best vantage point $n=(n_x, n_y)^T$ as being the frontier cell lying closest to the robot's current position $r=(r_x, r_y)^T$ and which may allow of areas occluded in the previous scan or scans, $$n = \min L(p, r) \quad (11)$$

where L(p, r) is the length of shortest path from current vantage position r to frontier position p.

It should be appreciated that the present invention provides numerous advantages over the prior art discussed above. For instance, in an embodiment, the resolution of the scan is enhanced while the time to complete the scan is reduced.

It should be noted that the present invention can have numerous modifications and variations. By the apparatus and methods of the present invention, 3D LIDAR scanners may be adapted, for example, for the following applications:

3D modeling,
Virtual reality and gamming,
Surveying,
Forensic/disaster scene virtual reconstruction,
As-built construction scanning,
Urban planning,
3D map generation, and
Robotics.

It will be understood that the embodiments described herein are merely exemplary and that a person skilled in the art may make many variations and modifications without departing from the spirit and scope of the invention. All such variations and modifications are intended to be included within the scope of the invention, as defined by the claims presented below.

We claim:

1. A method of adaptively positioning a range-measuring scanner within a three-dimensional scene, comprising the steps of:
    (a) positioning the scanner at a first vantage position, the first vantage position having positional values associated therewith;
    (b) scanning a first portion of the scene with the scanner, said first portion of the scene having a spatial arrangement of hues, thereby generating a first set of data points, each data point of the first set of data points having three positional values and a hue value associated therewith, the positional values defining the position of the data point on a first spatial three-coordinate system and the hue value being invariant with camera angle and lighting conditions and defining a fourth coordinate such that said first set of data points mimics the spatial arrangement of hues of the scanned first portion of the scene, the first spatial three-coordinate system and the fourth coordinate constituting a first four-coordinate system;
    (c) identifying occlusion boundaries of partially-occluded objects within the scanned first portion of the scene, said identifying step including a step of analyzing the distances from the scanner to adjacent data points of said first set of data points so as to identify pairs of adjacent data points in which the distance from the scanner of one member of each pair of points is greater than the distance from the scanner of the other member of the pair of points by at least a reference value;
    (d) projecting positional data from at least some of the first plurality of data points and the positional data for first vantage position, onto a bounded grid defining a plurality of cells, so as to locate traversable cells corresponding to areas within the scene through which the scanner may move and to locate occluded cells corresponding to the occlusion boundaries through which the scanner cannot move;
    (e) identifying cells on the grid corresponding to possible next vantage positions near the boundary of the grid, the possible next vantage positions not including occluded cells;
    (f) identifying the nearest possible next vantage position that requires the scanner to traverse the least number of traversable cells;
    (g) moving the scanner to a position within the scene corresponding to the next vantage position on the grid identified in step (f);
    (h) scanning a second portion of the scene, said second portion of the scene having a spatial arrangement of hues, thereby generating a second set of data points, each data point of the second set of data points having three positional values and a hue value associated with it, the positional values defining the position of the data point of the second set of data points on a second spatial three-coordinate system and the hue value being invariant with camera angle and lighting conditions and defining a fourth coordinate such that the second set of data points mimics the spatial arrangement of hues of the scanned a second portion of the scene, the second spatial three-coordinate system and the fourth coordinate constituting a second four-coordinate system;
    (i) registering the second set of data points against the first set of data points, said registering step including use of a hue-assisted iterative closest point ("HICP") algorithm and the step of transforming the second four-coordinate system to a transformed four-coordinate system which approximates the first four-coordinate system, said transforming step including the performance of mathematical operations performed on the positional values and hue values associated with data points in the second set of data points.

* * * * *